April 30, 1929.   R. B. SMITH   1,711,103
MECHANICAL MOVEMENT
Filed May 10, 1926
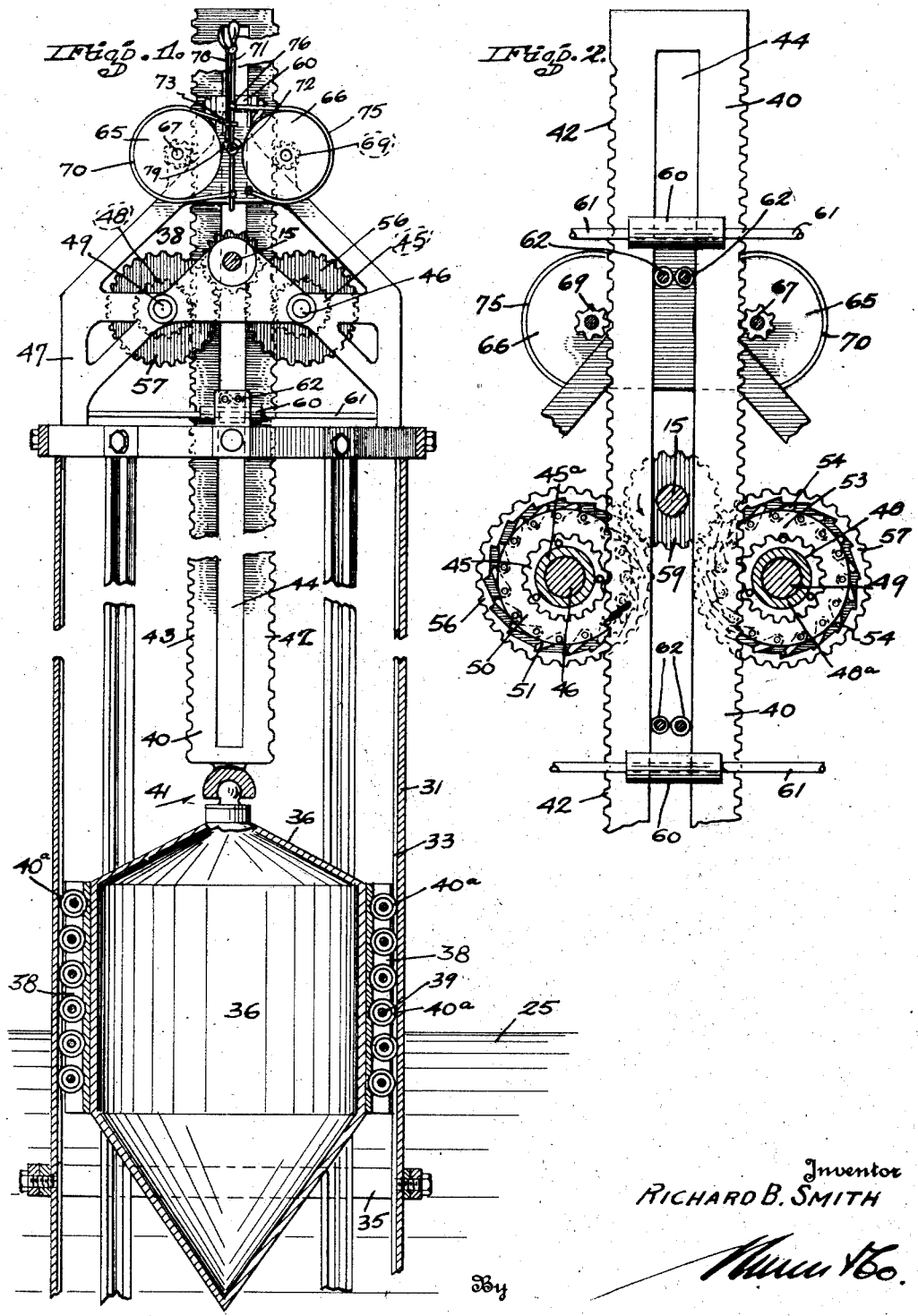

Patented Apr. 30, 1929.

1,711,103

UNITED STATES PATENT OFFICE.

RICHARD B. SMITH, OF SAN FRANCISCO, CALIFORNIA, ASSIGNOR OF ONE-FOURTH TO WILFRED C. HOWSE, OF SAN FRANCISCO, CALIFORNIA.

MECHANICAL MOVEMENT.

Application filed May 10, 1926. Serial No. 108,133.

This invention relates to mechanical movements and more particularly to a mechanical movement designed to obtain power by the rise and fall of a liquid.

In the apparatus of my invention I employ a vertically reciprocating float, and it is an object of my invention to provide means for generating power on both the upward and downward stroke of the float.

With the foregoing object in view, together with such other objects and advantages as may subsequently appear, this invention resides in the construction and arrangement of parts hereinafter described and claimed, and illustrated in the accompanying drawings in which Figure 1 is an elevational view partly in section of a wave motor unit, this view being broken away, and Figure 2 is an enlarged detailed view looking from the opposite side of that shown in Figure 1.

In carrying out my invention I provide an octagonal structure, comprising sides 31.

Secured to the sides 31 of the mentioned octagonal structure, are guides 33 extending downwardly into the water 25 and connected at their lower ends by a structure 35. Within the guides is disposed a float 36 tapered at its upper and lower ends and having a cylindrical body portion. Secured to the cylindrical portion of the float 36 at spaced intervals are members 38 in which are mounted shafts 39, each carrying a roller 40ᵃ fitting into a groove of one of the guides 33.

Means are thus provided whereby the float may readily be raised by the waves and fall by gravity and whereby the float may be guided. The float 36 at its top is connected to a double rack 40 by means of a ball and socket joint 41. It will be seen that the double rack 40 is provided with teeth 42 on one side and with teeth 43 on its other side, and has a central slot 44 extending longitudinally thereof.

The teeth 42 of the rack 40 are adapted to engage a rotatable gear wheel 45 mounted on a sleeve 45ᵃ which is carried on a shaft 46, supported by a frame 47, while the teeth 43 are adapted to engage a gear wheel 48 mounted on a sleeve 48ᵃ carried by a shaft 49 supported in the frame 47. The gear 45 is secured to an annular disk or wheel 50 which carries pivotally mounted dogs or pawls 51 which extend beyond the periphery of the disk 50. The gear 48 is secured to an annular disk 53 which carries dogs or pawls 54 pivotally mounted and extending beyond the periphery of the disk. The pawls 51 and 54 are respectively adapted to engage internal ratchets formed respectively in the gear wheels 56 and 57.

The gear wheels 56 and 57 are mounted on the shafts 46 and 49 respectively. The gear wheels 56 and 57 of each wave motor unit are adapted to engage a gear 59 which is mounted on the power shaft 15.

It will be seen from the foregoing that as the float is raised by the tide and waves, the rack 40 is also raised, and while being raised the gear 48, and therefore the disk 53 is turned in a clockwise direction when looking at Fig. 2 so that the dogs 54 will engage the internal ratchet of the gear wheel 57, causing the latter to rotate and turn the gear 59 which is fixedly mounted on the power shaft 15. Each dog is pressed outwardly by a spring (not shown) to keep it engaged with the ratchet.

It will further be seen that on the upward stroke of the rack 40 the gear wheel 45 will be turned counter-clockwise and that the disk 50 will also be turned counter-clockwise. However, the pawls 51, in moving counter-clockwise, will not lock with the internal ratchet of the gear wheel 56. On the downward stroke of the rack 40, however, the teeth 42 of the rack will engage the gear 45, turning the latter clockwise, which causes the dogs 51 to engage with the internal ratchet of the gear wheel 56, and to turn the latter which then transmits power to the gear 59.

In the apparatus of my invention I provide two pairs of spaced rollers abutting against the opposing sides of the rack 40 to guide the latter, these rollers being indicated by the numeral 60, and clearly shown in Figures 1 and 2. These rollers are mounted on shafts 61 and are suitably supported. Furthermore, to provide lateral guiding means for the rack I employ two pairs of rollers 62, which pass through the slot 44 of the rack and are mounted on shafts carried by the frame 47.

According to my invention I provide means for rendering the device inoperative, and such means are hereinafter shown as comprising a brake wheel 65 and another brake wheel 66. The brake wheel 65 has secured to it a gear wheel 67 which engages the teeth 43 of the rack while the wheel 66 has secured to it a gear wheel 69 which engages the teeth 42 of the rack. A brake band 70 is provided in order to brake the wheel 65. The brake band being secured at its lower end to an operating lever 71 pivoted at 72. The other end of the brake band 70 is secured to the frame 47 at a point 73. A brake band 75 is provided for the wheel 66, the lower end of this brake band being secured to the frame 47 while its upper end is secured to the lever 71 above the pivotal point of the lever, as indicated by the numeral 76.

The lever 71 has associated with it a locking means 78 which at its lower end may engage teeth formed in an arcuate member 79, shown in Figure 1.

It will be readily seen that a movement of the lever 71 towards the left will tighten the bands 70 and 75 on the wheels 65 and 66, thereby preventing these wheels from rotating and locking the gear wheels 67 and 69 with the rack 40.

It will be readily appreciated that the shaft 15 may be rotated by a number of units identical to the one described.

While I have described one embodiment of my invention, modifications thereof may be readily devised without departing from the spirit of my invention, and it is to be understood that such modifications come within the scope of the appended claim.

I claim:—

In combination, a horizontal shaft having a pinion thereon, a reciprocating rack bar slotted to straddle the shaft, two horizontal shafts mounted on opposite sides of the rack bar, gear wheels on said shafts meshing with the pinion, cog wheels mounted co-axially with the gear wheels and meshing with the rack bar and having discs fixed thereto riding in recesses in the gear wheels, internal teeth in the gear wheels and pawls pivoted to the discs and adapted to engage with said teeth for transmitting motion to each gear wheel in one direction only.

RICHARD B. SMITH.